UNITED STATES PATENT OFFICE 2,468,713

ISOCYANATES AND PRODUCTS PREPARED THEREFROM AND METHODS OF MAKING THE SAME

Edward L. Kropa, Old Greenwich, and Arthur S. Nyquist, Cos Cob, Conn., assignors to American Cyanamid Company, New York, N. Y., a corporation of Maine No Drawing. Application April 16, 1947,
Serial No. 741,956

23 Claims. (Cl. 260—80)

This invention relates to new and useful chemical compounds and other compositions of matter. More particularly the invention is concerned with new isocyanates, products prepared therefrom and methods of making the same. Still more particularly the invention relates to isocyanates represented by the general formula I        $CH_2=CH-Ar-N=C=O$ where Ar represents an aromatic hydrocarbon nucleus, for instance a benzene nucleus, an alkyl-substituted benzene nucleus, more particularly a lower alkyl-substituted benzene nucleus (e. g., a mono- or dimethyl-, mono- or diethyl-, mono- or dipropyl-, mono- or diisopropyl-, mono- or dibutyl-substituted benzene nucleus, etc.), a biphenyl nucleus, a terphenyl nucleus, a naphthalene nucleus, a methyl or other alkyl-substituted biphenyl, terphenyl or naphthalene nucleus, etc. In all of the compounds embraced by the above formula the vinyl and isocyanate groupings thereof are each attached directly to the aromatic ring. The scope of the invention also includes polymers, copolymers and other products prepared from the aforementioned isocyanates, as well as methods of preparing the said isocyanates, polymers, copolymers and other products.

Preferred classes of chemical compounds which are produced in accordance with the present invention are isocyanates represented by the general formula II
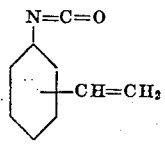

more particularly o-, m-, and p-vinylphenylisocyanates and mixtures thereof (e. g., a mixture of m-vinylphenylisocyanate and p-vinylphenylisocyanate); and chemical compounds represented by the general formula III
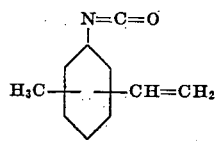

more particularly 2-methyl-3-vinylphenylisocyanate, 2-methyl-4-vinylphenylisocyanate, 2-methyl-5-vinylphenylisocyanate, 2-methyl-6-vinylphenylisocyanate, 3-methyl-2-vinylphenylisocyanate, 3-methyl-4-vinylphenylisocyanate, 3-methyl-5-vinylphenylisocyanate, 3-methyl-6-vinylphenylisocyanate, 4-methyl-2-vinylphenylisocyanate, 4-methyl-3-vinylphenylisocyanate, and mixtures thereof.

The present invention also provides compositions comprising a product of polymerization of a polymerizable mass including a compound represented by the general formula $CH_2=CH-Ar-N=C=O$ where Ar represents an aromatic hydrocarbon nucleus and in which the vinyl and isocyanate groupings thereof are each directly attached to the said nucleus. Or, alternatively, Ar may be defined as being a divalent aromatic hydrocarbon radical (e. g., phenylene, xenylene, naphthylene, etc.), including a divalent aliphatic-substituted aromatic radical (e. g., 2,4-tolylene, methyl-1,4-phenylene, ethyl-2,5-phenylene, isopropyl-3,4-phenylene, 1-butyl-2,4-naphthylene, etc.) Also embraced by our invention are substances comprising the product of reaction of (1) a product of polymerization of the kind described in the first sentence of this paragraph, for instance polymeric o-, m-, or p-vinylphenylisocyanates, a polymer of an isocyanate embraced by Formula III (e. g., polymeric 2-methyl-5-vinylphenylisocyanate), a copolymer of a mixture of m-vinylphenylisocyanate and p-vinylphenylisocyanate, etc., and (2) a compound containing a hydrogen atom which is reactive with the isocyanate grouping that is present in the polymerization product of (1), for instance compounds containing one or more —OH groups, e. g., alkyd resins containing —OH groups, alcohols, cellulose and cellulose derivatives containing free hydroxyl groups, etc., and nitrogen-containing materials containing hydrogen atoms which are reactive with an isocyanate grouping, e. g., ethylene imine, ethylene diamine, zein, casein, etc.

The present invention also provides polymerizable compositions comprising (1) an isocyanate of the kind represented by Formula I and more specifically by Formulas II and III and (2) a different organic compound which is copolymerizable with the isocyanate of (1), which contains a $CH_2=C<$ grouping and which is free from a hydrogen atom or atoms reactive with the isocyanate grouping, e. g., styrene, α-methyl styrene, dimethyl styrene, methyl acrylate, ethyl acrylate, N-dimethyl and other N-di-(hydrocarbon-substituted) acrylamides and methacrylamides, etc.; and products obtained by polymerizing the above-mentioned polymerizable compositions.

It is an object of the present invention to prepare a new class of chemical compounds, more particularly isocyanates.

Another object of the invention is to prepare new polymers and copolymers from the isocyanates of the invention.

Still another object of the invention is to prepare new reaction products and substances or compositions comprising such reaction products from the isocyanate polymers and copolymers of the invention, e. g., hydrolysis and alcoholysis products thereof.

A further object of the invention is to prepare liquid compositions which are especially valuable in treating textile materials, e. g., cotton, wool, rayon, etc., to impart improved properties thereto.

Another object of the invention is to prepare coating, laminating and molding compositions and molded articles utilizing new isocyanate polymers and copolymers. For example, the polymer or copolymer may be used as a binder for a filler or in pre-treating fillers, e. g., alpha-cellulose, wood flour, etc., prior to incorporation in a molding composition.

Still another object of the invention is to provide methods by which the products of the invention may be prepared.

Other objects will be apparent to those skilled in the art from the following more detailed description.

Various isocyanates were known and were suggested for different uses prior to our invention, including 1-alkenyl isocyanates, that is, an isocyanate in which the isocyanate grouping is attached to a carbon atom which is joined to a second carbon atom by an ethylenic bond. Such isocyanates embrace those represented by the formula R(H)C=C(R')NCO in which R and R' each represents hydrogen or a monovalent organic radical. Among the isocyanates included within this class which have been specifically mentioned are 1-phenylvinylisocyanate, the formula for which is IV 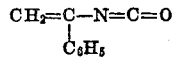

and styrylisocyanate, the formula for which is

V 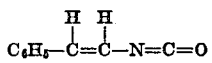

It was also suggested prior to our invention that copolymers of 1-alkenylisocyanates, specifically vinyl isocyanate, propenylisocyanate and isopropenylisocyanate, with a vinyl or vinylidene compound, specifically vinyl acetate, styrene and methyl methacrylate, be prepared. It was also suggested that solutions of such copolymers be applied to fabrics, specifically cellulosic materials, to impart water repellency thereto.

To the best of our knowledge and belief, the isocyanates embraced by Formula I constitute a new class of chemical compounds. These compounds have unusual and characteristic properties which make them particularly valuable, especially when used in the plastics, coating and textile-treating arts in the form of polymers and copolymers. Likewise, to the best of our knowledge and belief, it was not known prior to our invention that isocyanates of the kind represented by the general formula $CH_2=CH-Ar-N=C=O$, where Ar represents an aromatic hydrocarbon nucleus, specifically 2-methyl-5-vinylphenylisocyanate, o-, m- and p-vinylphenylisocyanates and mixtures thereof, would yield, upon polymerization alone or with a compound which is copolymerizable therewith, which contains a single $CH_2=C<$ grouping and which is free from a hydrogen atom or atoms reactive with the isocyanate grouping, polymeric and copolymeric compositions which, when applied in solution or dispersed state to woolen goods and the like, have the particular and peculiar property of imparting shrinkage resistance thereto, and yet effecting this result with a smaller amount of treating agent than generally is required. For example, when a toluene solution of a soluble copolymer of ethyl acrylate and a mixture of m- and p-vinylphenylisocyanate was applied to a piece of woolen goods and the treated goods was heated to evaporate the solvent and to insolubilize the copolymer, the treated cloth even after five launderings showed a shrinkage of only 2.2%, and a shrinkage of only 5% after 40 launderings. When similarly applied to woolen goods, a toluene-soluble copolymer of ethyl acrylate and 2-methyl-5-vinylphenylisocyanate yielded a treated wool that showed a shrinkage of only 2.8% after 5 launderings and of only 3.9% after 40 launderings. In marked contrast, untreated woolen cloth when similarly laundered for only 5 times showed a shrinkage of 44.5%. It was quite unexpected and unpredictable that isocyanate compositions of the kind with which this invention is concerned would impart such outstanding shrinkage resistance to an organic fabric, specifically a woolen fabric. Even more surprising was the fact that this shrinkage resistance was imparted to the woolen goods without in any way lessening its softness to the touch, and that these results were obtained by impregnating the woolen fabric with only about 8 to 9% by weight thereof of the copolymer, since with most treating materials about 14 to 16% by weight of treating agent, based on the dry weight of the woolen goods, is required in order to impart satisfactory shrinkage resistance thereto.

As indicated hereinbefore, particularly good results are obtained in the treatment of organic fabric materials with polymerization products, more particularly copolymer compositions, of our invention. These improved results are believed to be due to the fact that the linear molecules of the polymerization product, which in all cases contain an average of at least two isocyanate groupings per molecule, react with the fiber molecules of the wool to form a cross-linked polymeric product. This new product consists of two linear materials which are interwoven, namely, molecules of the wool fiber joined with molecules of resin. The "soft hand," that is, soft feeling to the touch, is believed to be due to flexible resin linkages between the wool molecules. Usually, when other materials are applied to wool in order to render it shrink-resistant, a harsh finish results due to the fibers becoming drawn together. By using copolymers, such as are produced in accordance with the present invention, in treating the wool, the rubber-like portion of the copolymer molecule, which portion is derived from the acrylic or other monomer copolymerized with the isocyanate, provides flexibility between the wool molecules with the result that the treated wool has a soft hand.

By employing isocyanate polymerization products, more particularly copolymer compositions, of the kind hereinbefore described, it is possible to obtain better control of the shrinkage of, for example, wool than is possible by the use of conventional materials. Another advantage is that a lesser amount of treating material than generally is employed produces the desired results. For example, if it is desired to treat cotton or rayon in order to render it shrink-resistant, it is common practice to use approximately 2 to 4% of a conventional resinous material to effect this result. However, if the cotton or rayon material also is to be made crease-resistant, then ordinarily it requires about 8 to 10% of a conventional resin to impart this property to the material. In the case of wool, as much as about 16% of conventional treating material may be required in order to provide satisfactory shrinkage and crease control of the woolen fabric.

By using our new isocyanate polymerization products, specifically copolymer compositions, outstanding shrinkage control and also crease control can be effected with the same amount of treating agent with obvious advantages. Furthermore, the same isocyanate polymerization product may be applied to textile materials made either of cotton, rayon or wool, or may be applied to mixed fabric materials, for example, textiles made of rayon and cotton, rayon and wool, rayon and regenerated fibers (both cellulosic and protein) and the like. An additional advantage, as previously indicated, is that a lesser amount of treating agent is required as compared with conventional materials.

Another advantage accruing from the chemical compounds of this invention results from the fact that in our new compounds a vinyl ($CH_2=CH-$) grouping and an isocyanate ($-N=C=O$) grouping are each directly attached to an aromatic hydrocarbon nucleus. Because of this structural arrangement, it is easier to polymerize these new isocyanates, alone or admixed with one or more $CH_2=C<$-containing monomeric materials which are different therefrom, are copolymerizable therewith, and which are free from a hydrogen atom or atoms reactive with the isocyanate grouping, thereby to obtain polymerization products (polymers and copolymers) varying in properties from viscous liquids to soluble, fusible resinous solids which are convertible to a substantially insoluble, substantially infusible state, e.g., either by prolonged heating or by reaction with a compound containing a hydrogen atom or atoms reactive with the isocyanate grouping.

Thus, it will be seen that our new isocyanates possess two entirely different types of functional groups attached directly to an aromatic nucleus, so that they are able to undergo not only a polymerization and copolymerization reaction through the vinyl grouping thereof, but also a condensation reaction through the isocyanate grouping with other reactive compounds, e.g., ethylene imine, bisulfites, malonic esters, other isocyanates, etc. In the compounds of our invention, the chemical stability of the ring nucleus imparts increased stability to the isocyanate compound as a whole, thereby making it easier to effect desired polymerization, copolymerization and condensation reactions. In marked contrast, with isocyanates such, for example, as the 1-alkenyl-isocyanates, a corresponding chemical stability in the compound as a whole ordinarily does not exist due, for one reason, to the fact that the isocyanate grouping is attached directly to an aliphatic chain. The chemical activity of isocyanates in which the isocyanate grouping is attached directly to an aromatic nucleus also is materially different from that of isocyanates in which the isocyanate grouping is directly attached to a carbon atom of an aliphatic chain. For example, the former are convertible to uretidinediones much more readily than the latter.

Various methods may be employed in preparing the chemical compounds of this invention. For example, compounds of the class embraced by Formula I or mixtures thereof may be prepared by effecting reaction between phosgene and a compound (or a mixture of compounds) represented by the formula $CH_2=CH-Ar-NH_2$, where Ar represents an aromatic hydrocarbon nucleus and in which the vinyl and amino groupings are each attached directly to the said nucleus, and isolating, e.g., by distillation, a compound of the class embraced by Formula I from the resulting reaction mass. This reaction preferably is effected while the said reactants are dissolved or dispersed in an inert liquid medium, e.g., benzene, toluene, xylene, chlorobenzene, tetrachloroethane, etc. The temperature of the reaction may be varied over a wide range, e.g., from $-10°$ C. up to the reflux temperature of the mixed reactants or of solutions of the mixed reactants. An excess of phosgene over that theoretically required for the formation of the isocyanate derivative usually is employed, e.g., from 1.1 to 5 or 6 or more mols of phosgene per mol of the vinyl amino aromatic hydrocarbon. It will be understood, of course, that when mixtures of vinyl aromatic hydrocarbons are caused to react with phosgene, then the reaction product comprises a mixture of the corresponding vinyl-substituted aromatic isocyanates, from which the individual compounds can be separated by known methods, e.g., by distillation when the isocyanates produced by the reaction have boiling points sufficiently different from each other.

The vinyl aromatic hydrocarbon which is used as a starting reactant may be prepared, for example, by nitrating an acylated aromatic hydrocarbon represented by the general formula VI
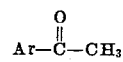

to obtain a nitrated acylated aromatic hydrocarbon represented by the general formula VII
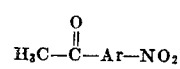

which then is reduced by contact with hydrogen as hereafter more fully described to obtain a compound represented by the general formula VIII
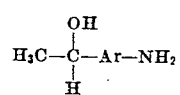

The latter compound is then dehydrated to the vinyl amino aromatic hydrocarbon, for example by direct heating or, preferably, by a direct vapor-phase catalytic dehydration.

The acetylated compound represented by Formula VI is prepared by acetylating an aromatic hydrocarbon with an acetylating agent such, for example, as acetic acid or anhydride, acetyl chloride or bromide, ketene, etc., in the presence of a Friedel-Crafts catalyst, e.g., aluminum chloride, aluminum bromide, ferric chloride, zinc chloride, boron fluoride, hydrogen fluoride, sulfuric acid, etc. The acetylation reaction may be carried out in a solvent, e.g., carbon disulfide, nitrobenzene or other solvent which, under the conditions of the reaction, is inert in a Friedel-Crafts type of reaction, or, the aromatic hydrocarbon, e.g., benzene, toluene, xylene, etc., may be acetylated in the absence of a solvent.

The acetylated compound, e.g., a compound represented by the formula

IX 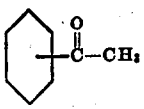

is nitrated, e.g., by treatment with fuming nitric acid at a low temperature, e.g., a temperature of −15° to +5° C., to obtain a nitrated acetylated compound which may be represented by the formula X 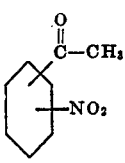

The nitrated acylated compounds, e. g., a compound of the kind represented by Formula X, is then reduced. Reduction may be effected in one or in two steps. By reducing the nitrated acylated compound with acidic reagents, e. g., iron and hydrochloric acid, tin and hydrochloric acid, etc., it is possible to interrupt the hydrogenation at the stage where an acylated amino compound is formed, e. g., a compound represented by the formula XI 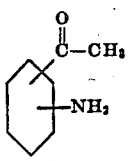

The acylated amino derivative can be reduced to the amino methylcarbinol compound by catalytic methods or by using a basic reducing agent, e. g., sodium amalgam, etc., thereby obtaining a compound such, for instance, as one represented by the formula XII 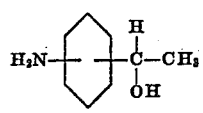

Under certain other conditions, e. g., through the use of Raney nickel catalyst, it is possible to convert the acylated nitro derivative directly to the amino methylcarbinol compound. The pressures may be considerably varied, but usually are within the range of 500 to 4000 pounds or more per square inch. In this way it is possible to reduce in one step both the nitro and acyl groups thereby to obtain a compound such, for instance, as one represented by Formula XII. The reduction with hydrogen may be catalyzed with other known hydrogenation catalysts, examples of which are cobalt, palladium, platinum, platinum oxide and copper chromite. With some catalysts reduction of the acylated nitro compound to the amino methylcarbinol derivative in one step can be effected, while with others only partial reduction (that is, to the amino acylated compound) is obtained. From the standpoint of handling, the direct reduction with hydrogen in one step is preferred, whereas from a cost standpoint reduction with an acidic reagent (examples of which have been given hereinbefore) to the amino acylated compound, followed by catalytic reduction to the amino methylcarbinol derivative, is preferred.

The amino methylcarbinol compound is then dehydrated to obtain a vinyl amino aromatic hydrocarbon, e. g., a compound represented by the formula XIII 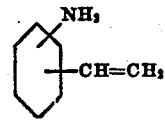

As indicated hereinbefore, we prefer to use a direct vapor-phase catalytic dehydration method. In accordance with this method the amino methylcarbinol derivative is brought into contact with, for example, activated alumina alone or with other metallic oxides, e. g., oxides of tungsten, molybdenum, manganese, chromium, zirconium, etc., more particularly by passing the vapors of the methylcarbinol derivative over the activated alumina or other vapor-phase dehydration catalyst in a system maintained at a pressure of, for example, 5 to 760 mm. mercury. When dehydration is effected in this manner at atmospheric or approximately atmospheric pressure, an inert, low-boiling, organic liquid preferably is employed as a diluent for the amino methylcarbinol compound.

The resulting vinyl amino aromatic hydrocarbon is then caused to react with phosgene to obtain an isocyanate such, for example, as one represented by the formula XIV 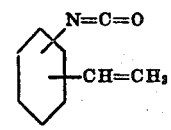

which formula also may be written as

XV 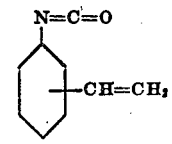

By using the appropriate starting reactant other vinyl aromatic isocyanates similarly may be prepared, e. g., isocyanates represented by the formula XVI 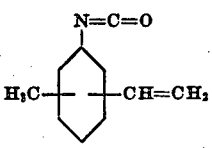

The polymerization products (polymers and copolymers) of this invention are prepared under anhydrous conditions. The isocyanate monomer or mixture thereof with another monomeric material may be polymerized, for example, under heat, light or heat and light in the presence or absence of a polymerization catalyst such, for instance, as boron fluoride, benzoyl peroxide or other organic peroxide or other catalyst which is free from a hydrogen atom or atoms that would react with the isocyanate grouping. Ultra-violet light is more effective than ordinary light. If desired, the monomeric isocyanate or mixture of copolymerizable materials containing the same may be polymerized in solution state, for instance in solution in an inert organic solvent, e. g., benzene, toluene, xylene, dioxane, ethers (e. g., dibutyl ether), esters (e. g., butyl acetate), chlorobenzene, ethylene dichloride, ketones (e. g., methyl ethyl ketone), etc. The temperature of polymerization may be varied as desired or as conditions may require, but ordinarily will be within the range of from about 20° to about 150° C. when polymerization is effected in the absence of a solvent. When polymerization is effected in solution state then, depending, for example, upon the particular catalyst employed, it is generally carried out at the boiling temperature of the solution. With certain catalysts, e. g., gaseous boron fluoride, polymerization preferably is effected at a temperature below 20° C., for instance in solution state at 0° to −80° C. In all cases, the temperature of polymerization is below the decomposition temperature of the monomer or mixture of monomers.

In preparing the polymers and copolymers of our invention we prefer to use heat and a catalyst which is free from hydrogen or other groups reactive with the isocyanate grouping, e. g., benzoyl peroxide, di-(tertiarybutyl) peroxide, acetyl peroxide, etc., since thereby we are better able to obtain soluble polymers and copolymers. When such a soluble polymer or copolymer is exposed to light, insolubilization occurs. This reaction appears to take place through the direct polymerization of the isocyanate grouping. It is possible to effect insolubilization by exposing the polymer or copolymer to the action of ultraviolet light or by long exposure to diffused daylight. By proper selection of the polymerization conditions it is possible to obtain, at will, soluble or insoluble materials.

As pointed out hereinbefore, it is advisable to avoid during the polymerization the use of any compounds which are capable of reacting with the isocyanate grouping, e. g., alcohols, acids, water, etc. However, the soluble polymeric products of high molecular weight may be dissolved in an inert organic liquid which is insoluble in water, after which the organic solution of the polymeric or copolymeric isocyanate is emulsified. The presence of the organic liquid appears to act as a barrier to prevent water from coming in contact with the isocyanate polymerization product. In order further to impede the transfer of liquid water and water vapor, one can introduce into the initial solution a small amount of material which is known to impede the transfer of water vapor, e. g., polyethylene, crystalline products such as paraffin, microcrystalline waxes, etc.

Illustrative examples of monomeric materials which may be copolymerized with the isocyanates hereinbefore described to produce the new copolymers of this invention are N-dialkyl acrylamides, e. g., N-dimethyl, -diethyl, -dipropyl, -dibutyl, -diamyl, -dihexyl, -dioctyl, etc., acrylamides; the acrylic, α-alkyl acrylic and α-haloacrylic esters of saturated monohydric alcohols, for instance saturated aliphatic monohydric alcohols, e. g., the methyl, ethyl, propyl, isopropyl, butyl, isobutyl, amyl, etc., esters of acrylic, methacrylic, ethacrylic, propacrylic, chloroacrylic, bromoacrylic, etc., acids; the phenyl, benzyl, phenylethyl, etc., esters of the aforementioned acids; vinyl aromatic hydrocarbons, e. g., styrene, α-methyl styrene, dimethyl styrenes, dichlorostyrenes, cyanostyrenes, vinyl naphthalenes, etc.; the vinyl and vinylidine halides, e. g., vinyl and vinylidene chlorides, bromides, etc.; alkyl vinyl ketones, e. g., methyl vinyl ketone, ethyl vinyl ketone, methyl isopropenyl ketone, etc.; itaconic diesters containing a single $CH_2=C<$ grouping, e. g., the dimethyl, diethyl, dipropyl, dibutyl and other saturated aliphatic monohydric alcohol diesters of itaconic acid, diphenyl itaconate, dibenzyl itaconate, di-(phenylethyl) itaconate, etc.; allyl and methallyl esters of saturated aliphatic monocarboxylic acids, e. g., allyl and methallyl acetates, allyl and methallyl propionates, allyl and methallyl valerates, etc.; vinyl thiophene; vinyl pyridine; vinyl pyrrole; nitriles containing a single $CH_2=C<$ grouping, e. g., acrylonitrile, methacrylonitrile, etc. Mixtures of the aforementioned monomeric materials may be employed, if desired, as well as mixtures of such monomer or monomers with other copolymerizable materials containing a $CH_2=C<$ grouping. The material which is mixed and polymerized with the isocyanate in all cases should be copolymerizable with the isocyanate, should contain a $CH_2=C<$ grouping, but should not contain any hydrogen atom or atoms which will react with the isocyanate grouping. In cases where the isocyanate and other monomer are not copolymerizable or are copolymerizable only with difficulty in a two-component system, e. g., a mixture of vinylphenylisocyanate and vinyl acetate, a third monomer, e. g., acrylonitrile, may be added so as to obtain a compatible, homogeneous mass of copolymerizable ingredients.

The copolymers of this invention are prepared by mixing the isocyanate with a different organic compound of the kind hereinbefore described, numerous examples of which previously have been given. Examples of preferred classes of such compounds are the acrylic compounds which contain a single $CH_2=C<$ grouping, are copolymerizable with the isocyanate and which are free from a hydrogen atom or atoms reactive with the isocyanate grouping, for instance the acrylic esters of saturated aliphatic monohydric alcohols (e. g., methyl, ethyl, propyl, isopropyl, n-butyl, isobutyl, hexyl, etc., acrylates), the N-dialkyl acrylamides and methacrylamides (e. g., N-dimethyl, N-diethyl, N-dipropyl, N-di-n-butyl, etc., acrylamides and methacrylamides), etc.; monovinyl aromatic compounds which are different from the isocyanate and are copolymerizable therewith, which contain a single $CH_2=C<$ grouping and which are free from a hydrogen atom or atoms reactive with the isocyanate grouping, e. g., styrene, the various chlorostyrenes, the various monomethyl and dimethyl styrenes, the various cyanostyrenes, etc.

Among the preferred copolymers of our invention are those which are the products of polymerization of a mixture containing (1) an isocyanate of the kind represented by Formula II, or mixtures thereof (e. g., a mixture of m-vinylphenylisocyanate and p-vinylphenylisocyanate), or of the kind represented by Formula III, e. g., 2-methyl-5-vinylphenylisocyanate, or mixtures thereof, or mixtures containing an o-, m- or p-vinylphenylisocyanate and 2-methyl-5-vinylphenylisocyanate or other isocyanate or isocyanates of the kind embraced by Formula III, and (2) ethyl acrylate, styrene or other acrylic ester or other acrylic compound or monovinyl aromatic compound or other compound or compounds of the kinds which are more fully described in the preceding paragraph and elsewhere herein. As indicated hereinbefore, the monomeric isocyanates and copolymerizable mixtures thereof may be polymerized or reacted until products which are soluble in inert organic liquids are obtained or until substantially insoluble, substantially infusible polymerization products are secured.

If desired, the polymeric isocyanates of this invention may be reacted with aromatic isocyanates which are free of polymerizable substituent groupings to form uretidinediones. Alternatively, a monovinyl diphenyl uretidinedione may be employed in the initial polymerization to obtain a polymer which will generate the isocyanate on heating. Moreover, other known derivatives which form weak association compounds with the isocyanates, e. g., sodium bisulfite, hydrochloric acid, certain of the enolic bodies such as the malonic esters and the acetoacetic esters, etc., may be used to produce compounds which generate isocyanates on heating.

In the preparation of copolymers, the proportions of copolymerizable materials may be varied over a wide range, e. g., from, by weight, 2 to 98% of the isocyanate to from 98 to 2% of the other copolymerizables ingredient or ingredients. In all cases the proportions are such that the resulting polymerization product has an average of at least two isocyanate groupings per molecule. Particularly useful copolymer compositions are obtained when the mixture of copolymerizable materials contains, by weight, from about 3 to about 50% of the isocyanate and from about 50 to 97% of the other copolymerizable monomer. Thus, we may prepare in accordance with our invention toluene-soluble copolymers of, by weight, from about 3 to about 50% of ethyl acrylate or styrene and about 97 to about 50% of an isocyanate of the kind with which this invention is concerned, more particularly isocyanates such as are embraced by Formulas II or III, or mixtures thereof, e. g., a mixture of m-vinylphenylisocyanate and p-vinylphenylisocyanate. In producing soluble copolymers for use in treating wool and other textile materials, we prefer to use a mixture of, by weight, about 5 to about 15% of the isocyanate and about 95 to about 85% of the other copolymerizable monomer. When the copolymer is used in such applications no particular advantage ordinarily accrues when the isocyanate is used in an amount much above about 15%, by weight, of the mixed ingredients although more may be used if desired, e. g., the isocyanate may constitute 30 or 40% or even as much as 50% of the polymerizable mixture. Good results have been obtained with a mixture of, by weight, about 10% of the isocyanate and about 90% of the other copolymerizable monomer.

In order that those skilled in the art better may understand how the present invention may be carried into effect, the following examples are given by way of illustration and not by way of limitation. All parts are by weight.

Example 1

Two hundred and forty parts of a mixture of aminostyrenes composed substantially of m- and p-aminostyrenes (analysis as determined by Raman spectra) in 220 parts of toluene is added to a stirred solution of 340 parts of styrene in 660 parts of toluene over a period of 37 minutes, while keeping the reaction temperature at 0° to −3° C. by means of an ice-salt bath. This is in the ratio of 1.75 mols of phosgene per mol of the aminostyrene mixture. A white precipitate of carbamyl chloride immediately forms. After removing the cooling bath, the reaction mass is allowed to warm to room temperature in the course of 1 hour, after which it is heated by means of an oil bath. Upon reaching 50° C. the white precipitate has almost completely dissolved. The solution is then heated under reflux at the boiling temperature of the mass for 2 hours, a slow stream of gaseous phosgene being bubbled through the hot solution during the last ½ hour.

The toluene is distilled off with the aid of a pump, after which the liquid residue is distilled under vacuum to obtain 226 parts (77.5% of the theoretical) of a crude vinylphenylisocyanate (a mixture comprising mainly m-vinylphenylisocyanate and p-vinylphenylisocyanate), which boils at 47°–61° C. at 0.1 mm. pressure. Redistillation through a 6-inch column of 6 mm. Raschig rings yields 207 parts (71% of the theoretical) of a purer product in the form of a colorless, mobile liquid boiling at 39°–41° C. at 0.05 mm. pressure. With aniline it gives a urea, M. P. 170°–171° C.; and colorless needles from ethanol.

Example 2

To a cold solution of 250 parts of phosgene in 520 parts of toluene is added dropwise 140 parts of 3-amino-4-methylstyrene over a period of 25 minutes while keeping the reaction temperature at −2° to −5° C. by means of an ice-salt bath. A recipitate of carbamyl chloride forms immediately upon the addition of the 3-amino-4-methylstyrene solution to the phosgene solution. After standing for an hour without the cooling bath, the reaction mass is heated by means of an oil bath. After refluxing for about 1 hour the carbamyl chloride dissolves. The toluene is now distilled off with the aid of a pump, after which the liquid residue is distilled under vacuum to obtain 54 parts (31% of the theoretical) of 2-methyl-5-vinylphenylisocyanate as a colorless, mobile liquid, boiling for the most part at 52°–54° C. at 0.1 mm. pressure. With aniline it gives the unsymmetrical urea, M. P. 195°–196° C.

Example 3

| | Parts |
|---|---|
| m-Vinylphenylisocyanate | 35 |
| p-Vinylphenylisocyanate | 65 | are heated together under an atmosphere of carbon dioxide in a closed reaction vessel which is placed in an oil bath maintained at 110° C. Heating is continued at a bath temperature of 110° C. for 6 hours and the reaction mass then allowed to cool to room temperature over a period of about 16 hours. Thereafter heating is continued for an additional 40 hours at the same bath temperature, yielding a clear, very viscous, toluene-soluble copolymer. Upon heating for another hour at the same temperature, the viscous copolymer is converted into a gel.

Example 4

| | Parts |
|---|---|
| Styrene | 90.0 |
| Mixture of, by weight, about 35% m-vinylphenylisocyanate and about 65% p-vinylphenylisocyanate | 10.0 |
| Benzoyl peroxide | 0.2 | are mixed and heated under anhydrous reflux conditions in a reaction vessel placed in an oil bath maintained at 110° C. The system is flushed out with carbon dioxide before heating, using a pellet of dry ice. Heating under reflux is continued for 8 hours during which time the reaction mass becomes extremely viscous. After allowing the resulting toluene-soluble, liquid copolymer to cool to room temperature over a period of about 16 hours, heating is continued under reflux and under anhydrous conditions for an additional 5 hours, yielding a copolymer in gel state which becomes highly swollen but does not dissolve in toluene.

Example 5

The same ingredients and proportions thereof are used as in Example 4. The mixture is heated under an atmosphere of carbon dioxide in a closed reaction vessel which is placed in a 110° C. oil bath. Heating is continued at a bath temperature of 110° C. for 4½ hours, the reaction mass becoming progressively more viscous as heating proceeds. At the end of the heating period the copolymer is obtained in the form of a gel, which becomes highly swollen but does not dissolve in toluene.

Example 6

| | Parts |
|---|---|
| Ethyl acrylate | 45.0 |
| Mixture of, by weight, about 35% m-vinylphenylisocyanate and about 65% p-vinylphenylisocyanate | 5.0 |
| Benzoyl peroxide | 0.2 |
| Redistilled toluene | 35.0 |

Thirty-five parts of redistilled toluene are placed in a reaction vessel provided with a reflux condenser, stirrer and dropping funnel. The reaction vessel is placed in a 130° C. oil bath. The toluene is slowly stirred and heated so that mild refluxing prevails. A pellet of dry ice is added to flush out the system with carbon dioxide. The previously mixed monomers and catalyst are added to the gently refluxing toluene over a period of 16 minutes, using drying tubes to maintain anhydrous conditions in the reaction vessel. Reflux continues at a moderate rate for about 10 minutes after adding the solution of monomers and catalyst, and then gradually subsides. Heating is continued for an additional 3½ hours at a bath temperature of 133°–135° C., yielding a clear, moderately viscous solution of a copolymer of the ethyl acrylate and isocyanates. After partial cooling of this solution, 50 parts of redistilled toluene is added thereto while transferring it from the reaction vessel.

When a small portion of the toluene solution is treated with a few drops of ethylene diamine, gelation occurs almost immediately with the formation of a reaction product of the ethylene diamine and the copolymer of the aforementioned monomers. This rapidity of gelation indicates the high degree of reactivity of the copolymer.

The toluene solution of the above-described copolymer contains about 45.5% by weight of copolymer. It is diluted with additional toluene to a concentration of about 10% by weight of copolymer. A piece of woolen goods (9"x23" in size) is immersed in the 10% copolymer solution, and passed through squeeze rolls. The impregnated wool contains approximately 8 to 9% of copolymer. The sample is framed, air-dried for a short period, and then heated for 9 minutes at 290° F. After cooling to room temperature, the sample is removed from the frame, allowed to remain undisturbed for about 16 hours and is then measured prior to laundering. The method of laundering is a modification of the standard method of the A. A. T. C. C., and involves heating for 20 to 30 minutes at 240° F. while drying after each washing. After a cycle of 5 washings (10 minutes in soap solution) and drying operations, the dried treated cloth shows a shrinkage of only 2.2%. After a total of 40 washing and drying cycles, the shrinkage is only 5%. The laundered wool has a soft hand.

Example 7

| | Parts |
|---|---|
| Styrene | 90.0 |
| Mixture of by weight, about 35% m-vinylphenylisocyanate and about 65% p-vinylphenylisocyanate | 10.0 |
| Benzoyl peroxide | 0.2 |
| Redistilled toluene | 200.0 |

The above ingredients are mixed and heated under anhydrous reflux conditions for 24 hours in a reaction vessel placed in an oil bath maintained at 110° C. A slight increase in viscosity is noticeable as heating proceeds.

A portion of the solution is diluted with an excess of methanol to coagulate the copolymer, which then is isolated and redissolved in toluene. A small portion of the resulting solution is treated with a few drops of ethylene diamine. Gelation occurs very rapidly upon stirring in the ethylene diamine, forming a reaction product thereof with the copolymer of the aforementioned monomers. This rapidity of gelation indicates the high degree of reactivity of the copolymer.

Example 8

| | Parts |
|---|---|
| Styrene | 90.0 |
| Mixture of, by weight, about 35% m-vinylphenylisocyanate and about 65% p-vinylphenylisocyanate | 10.0 |
| Benzoyl peroxide | 0.2 |
| Tetrachloroethane | 100.0 |

The above ingredients are heated under anhydrous reflux conditions for 18 hours in a reaction vessel placed in a 110°–112° C. oil bath. There is a moderate increase in viscosity and some discoloration as heating proceeds. The solution is diluted with an excess of methanol to coagulate the copolymer, which is isolated, broken up into small pieces, and then extracted with three fresh portions of methanol. The mass is allowed to stand at room temperature for 2 hours after each addition of methanol. The dried copolymer swells somewhat but does not dissolve in toluene.

Example 9

| | Parts |
|---|---|
| m-Vinylphenylisocyanate | 35 |
| p-Vinylphenylisocyanate | 65 |
| Boron fluoride-ethyl ether complex about | 1 |

When the boron fluoride-ethyl ether complex is added at room temperature to the above mixture of monomeric isocyanates, there is no visual evidence of immediate copolymerization, but upon standing at room temperature for about 16 hours the viscosity of the mass increases and a copolymer is formed.

Instead of using a boron fluoride-ethyl ether complex as above described, we may employ gaseous boron fluoride and a lower polymerization temperature, e. g., 0° C. The mixed isocyanates may be copolymerized in solution state, using gaseous boron fluoride as a polymerization catalyst, at temperatures of 0° to —80° C.

Example 10

| | Parts |
|---|---|
| Styrene | 90.0 |
| Mixture of, by weight, about 35% m-vinylphenylisocyanate and about 65% p-vinylphenylisocyanate | 10.0 |
| Benzoyl peroxide | 0.2 |
| Chlorobenzene (monochlorobenzene) | 150.0 | are heated together under anhydrous reflux conditions for 18 hours in a reaction vessel placed in a 110°–115° C. oil bath, yielding a slightly discolored gel of a copolymer of styrene and the mixture of the aforementioned isocyanates.

Example 11

| | Parts |
|---|---|
| m-Vinylphenylisocyanate | 63.0 |
| p-Vinylphenylisocyanate | 117.0 |
| Benzoyl peroxide | 0.36 | are heated together for 50 minutes in a closed reaction vessel placed on a steam bath, yielding a copolymer of m-vinylphenylisocyanate and p-vinylphenylisocyanate in the form of a slightly discolored gel. Upon further heating at around 100°–110° C. this gel is converted into a hard, substantially insoluble, substantially infusible copolymer.

Example 12

| | Parts |
|---|---|
| Ethyl acrylate | 45.0 |
| 2-methyl-5-vinylphenylisocyanate | 5.0 |
| Benzoyl peroxide | 0.2 |
| Redistilled toluene | 33.0 |

The same general procedure is followed as described under Example 6. The previously mixed monomers and catalyst are added to the gently refluxing toluene over a period of 20 minutes, after which heating is continued at a bath temperature of 130°–135° C. for 2 hours, yielding a clear, fairly viscous solution of a copolymer of the ethyl acrylate and 2-methyl-5-vinylphenylisocyanate. After partial cooling of this solution, 50 parts of redistilled toluene is added thereto while transferring it from the reaction vessel.

When a small portion of the toluene solution is treated with a few drops of ethylene diamine, gelation occurs almost immediately with the formation of a reaction product of the ethylene diamine and the copolymer of ethyl acrylate and 2-methyl-5-vinylphenylisocyanate. This rapidity of gelation indicates the high degree of reactivity of the copolymer.

The toluene solution of the above-described copolymer contains about 46.7% by weight of copolymer. It is diluted with additional toluene to a concentration of about 10% by weight of copolymer.

A piece of woolen goods is treated with the 10% solution of the copolymer in toluene as described under Example 6. After a cycle of 5 washing and drying cycles as described under that example, the dried treated cloth shows a shrinkage of only 2.8%. After a total of 40 washing and drying cycles, the shrinkage is only 3.9%. The laundered wool has a soft hand.

Example 13

| | Parts |
|---|---|
| Styrene | 35.0 |
| 2-methyl-5-vinylphenylisocyanate | 3.5 | are heated together for 4 hours under an atmosphere of carbon dioxide in a closed reaction vessel placed in an oil bath maintained at 115°–120° C. At the end of this heating period a clear, quite viscous copolymer results. The liquid copolymer is diluted with approximately an equal volume of redistilled toluene.

When a small portion of the toluene solution of the copolymer is treated with a small amount of ethylene diamine (e. g., about 1 to 3% by weight thereof), gelation occurs almost immediately with the formation of a reaction product of the ethylene diamine and the copolymer of styrene and 2-methyl-5-vinylphenylisocyanate. This gel may be converted, if desired, to a hard, substantially insoluble, substantially infusible reaction product upon prolonged heating at 100°–110° C.

Another portion of the toluene solution of the copolymer is flowed upon a glass plate to form a thin coating thereon. After air-drying for about 10 minutes, the coated plate is heated for 2 hours at 100° C. A hard, clear, baked film is formed on the plate.

Example 14

A

| | Parts |
|---|---|
| Ethyl acrylate | 65.7 |
| Mixture of m-vinylphenylisocyanate and p-vinylphenylisocyanate | 5.3 |
| Benzoyl peroxide | 0.292 |
| Redistilled toluene | 50.0 |

The same general procedure is followed as described under Example 6. The previously mixed monomers and catalyst are added to the gently refluxing toluene over a period of 29 minutes, after which heating is continued at a bath temperature of 132°–135° C. for 3 hours. The reaction mass is now allowed to stand for about 65 hours at room temperature in a tightly closed container, yielding a very viscous solution of the copolymer which is near the point of gelation.

B. To the copolymer solution of A is added 50 parts of toluene. A solution of 2.16 parts of ethylene imine in 25 parts of toluene is added dropwise to the copolymer solution over a period of 36 minutes. The reaction mass becomes increasingly more viscous and turbid during the addition of the ethylene imine solution. Stirring is continued at room temperature thereby causing the reaction mass, comprising a reaction product of ethylene imine and a copolymer of ethyl acrylate, m-vinylphenylisocyanate and p-vinylphenylisocyanate, to become more and more viscous. After stirring in this manner for 1 hour the reaction mass forms a gel. Upon heating this gel for 1 to 2 hours at 100°–110° C., the toluene is evaporated and a hard, substantially insoluble, substantially infusible reaction product results.

It will be understood, of course, by those skilled in the art that our invention is not limited to the use of the specific ingredients named in the above illustrative examples nor to the particular proportions there shown. Thus, instead of a mixture of m-vinylphenylisocyanate and p-vinylphenylisocyanate we may use either of these isocyanates alone, or o-vinylphenylisocyanate alone or admixed with either or both of the meta and para derivatives; or, instead of 2-methyl-5-vinylphenylisocyanates, we may use any of the other isomers of the methyl vinyl phenylisocyanates alone or admixed with each other or with any of the other isocyanates embraced by Formula I; or, we may use, for example, a vinyl mono- or diethyl phenylisocyanate, a vinyl mono-, di-, tri- or tetramethyl biphenylisocyanate, a vinyl mono-, di-, tri- or tetraethyl naphthylisocyanate, or any other isocyanate or mixtures of isocyanates of the kind embraced by Formula I.

Likewise, monomeric materials other than the styrene and ethyl acrylate specified in some of the examples may be copolymerized with the isocyanate. For example, we may use methyl acrylate, propyl acrylate, n-butyl acrylate, amyl acrylate, hexyl acrylate, methyl methacrylate, ethyl methacrylate, acrylonitrile, methacrylonitrile, allyl acetate, dichlorostyrene, N-dibutyl acrylamide or any other compound which is copolymerizable with the isocyanate, which contains a $CH_2=C<$ grouping, more particularly a single $CH_2=C<$ grouping, and which is free from a hydrogen atom or atoms reactive with the isocyanate grouping, numerous examples of which compounds previously have been given. If desired, mixtures of monomers may be copolymerized with a single isocyanate or with a plurality of isocyanates.

Catalysts other than benzoyl peroxide also may be employed, but if a catalyst is used it is desirable to use one which contains no hydrogen atom or atoms that will react with the isocyanate grouping. Examples of catalysts that may be employed are inorganic peroxides such, for example, as barium peroxide, etc.; dialkyl peroxides, e. g., lauryl peroxide, stearyl peroxide, di-(tertiary-butyl) peroxide, etc.; symmetrical diacyl peroxides, e. g., acetyl peroxide, lauroyl peroxide, stearoyl peroxide, etc.; unsymmetrical or mixed diacyl peroxides, e. g., acetyl benzoyl peroxide, etc. Any suitable amount of catalyst may be used, but in general the catalyst concentration will be within the range of about 0.05 to 2 or 3% by weight of the monomeric material or of the mixed copolymerizable materials.

The polymers and copolymers of the present invention contain at least two isocyanate groupings per molecule. Such a bifunctional isocyanate polymerization product, even such polymeric bodies having a high molecular weight, can then be reacted with a hydrogen-donor substance, that is, a substance containing a hydrogen atom which is reactive with an isocyanate grouping, to yield reaction products having a still higher molecular weight. In many respects such products resemble the naturally occurring derivatives, e. g., proteins and carbohydrates of high molecular weight, and the mechanism used to bring about the reaction or formation may be similar in each case. That the mechanism may be the same is supported by the fact that it is now recognized that there are two types of groupings in proteins and in carbohydrates and that, by suitable transformations, it is possible to reunite the smaller segments which are present in such compounds.

Thus, for example, by copolymerizing a minor amount of vinylarylisocyanate with a major amount of a different vinyl compound, or other compound which is copolymerizable therewith, which contains a single $CH_2=C<$ grouping and which is free from a hydrogen atom reactive with an isocyanate grouping, so as to obtain a copolymer of relatively low molecular weight, it is then possible to align such a copolymer into a giant polymeric network by causing the residual isocynate groupings in the low-molecular weight copolymer to react with a hydrogen-donor material. This giant network assumes the structure of the naturally occurring products. For best results, an average of at least two isocyanate groupings per copolymer molecule are necessary in order to build up this grid network.

Most fiber-like products are crystalline, but even in highly crystalline fibers certain amorphous areas are known to exist. This follows from the fact that the fiber molecule can be larger than the crystals therein, and a single fiber molecule can pass through a crystalline and amorphous range. By decreasing the size of the fiber molecule it is possible to align the molecules so as to effect more complete crystallization at the expense of the amorphous content of the fiber. With the prior fiber-forming materials, when the molecular weight is decreased in order to achieve crystallization, the final fiber has poor mechanical properties, e. g., poor tensile strength.

With the reactants employed in practicing the present invention, two different reactions are used in making a finished filament or fiber. The primary reaction or polymerization product (polymer or copolymer) can be of relatively low molecular weight. Such a low-molecular-weight material can be induced to crystallize readily, and the crystalline product then can be converted into a material of substantially higher molecular weight through reaction of its isocyanate groupings with a hydrogen-donor material. Consequently, one can secure both high-molecular-weight materials and a high degree of crystallinity by reason of the polymerization reaction which takes place through the vinyl groupings, followed by a condensation reaction through the isocyanate groupings with a hydrogen-donor material, and thereby obtain final filaments or fibers having superior tensile strength, superior solvent resistance and other improved physical and chemical properties. Moreover, with low-molecular-weight polymers, the viscosity of spinning solutions made therefrom is lower than spinning solutions made from conventional filament-forming materials. One of the advantages of a low-viscosity spinning solution is that the solution can be de-aerated more readily. Moreover, a higher concentration of polymer can be employed in the spinning solution.

The filaments or fibers produced by spinning the polymer or copolymer of relatively low molecular weight in the spinning bath can then be treated, e. g., by immersion in a suitable hydrogen-donor liquid, to cause hardening and superpolymer formation to take place through the reaction between the isocyanate groupings thereof and the functional hydrogen-containing groups in the treating liquid.

Other advantages also can be secured by introducing isocyanate groupings, as by the use of a vinylarylisocyanate, into synthetic fibers. For example, fibers and fabric materials made from, for instance, polymers and copolymers of acrylonitrile and from vinyl chloride copolymers present difficult dyeing problems. By introducing isocyanate groupings in or on such fibers or fabrics, as by treating the formed fiber or fabric with a solution or dispersion of a reactive polymeric or copolymeric vinylarylisocyanate and subsequent heating, or by forming the fiber from a suitable copolymer of a vinylarylisocyanate, it is possible to anchor dyes on the fiber or fabric by a chemical reaction between the dye and the isocyanate grouping which has thus been introduced in or on the fiber or fabric to be dyed. In other words, dyeing may be accomplished by chemical reaction rather than by physical absorption.

The superior characteristics obtained by using copolymers containing functional isocyanate groupings as herein described appear to reside, to a substantial extent, in the marked separation between the isocyanate groupings thereof. By separating the isocyanate groupings and, at the same time, having them attached by primary valence bonds, one is able to bridge any of the higher polymeric species which are known to be present in, for instance, proteins (e. g., wool) and carbohydrates (e. g., cellulose). Although the real seat of the reaction between the isocyanate and, for example, a protein molecule is not known it is probable that the reaction occurs between the so-called "salt" linkages that are known to exist in such molecules, especially as present in wool. Since the isocyanate molecule is capable of reacting with both portions of the salt, that is, with the amino group and with the carboxyl group, the replacement of the salt linkages by primary valence bonds is instrumental in decreasing the tendency of the wool to undergo contraction during immersion in water. Since these salt linkages are dispersed at relatively wide distances in the wool molecule, optimum results are obtained when the distances between the isocyanate groupings are so regulated that several of these salt bridges may be knit into a single entity.

Moreover, it is possible that the high-molecular-weight isocyanates may bring together into a superpolymeric state many of the smaller protein segments known to exist in the protein structure. In a similar manner the isocyanates herein described may unite into a single polymeric structure the lower molecular weight residues found in, for example, rayon, thereby yielding a material having a structure resembling that of native cellulose.

Our new chemical compounds are useful not only in the production of polymers and copolymers but also as intermediates in the preparation of derivatives thereof. For example, the monomers may be nuclearly halogenated (e. g., chlorinated, brominated, etc.), nuclearly sulfonated, etc. Or, the polymers themselves may be halogenated (e. g., chlorinated, brominated, etc.), hydrogenated, hydrolyzed, alcoholyzed, sulfonated, etc.

The polymerization products (polymers and copolymers) of this invention have a wide variety of commercial applications. For instance, they may be employed as adhesives, e. g., in bonding sheets of wood veneer to each other or to base materials formed of wood or of other substance, in bonding metal to metal, metal to rubber, wood to metal, glass or ceramic materials to metal, glass to glass in making, for example, laminated safety glass, etc.

In addition to their use in treating cotton, rayon, silk, wool, and other textile materials, our new polymers and copolymers also may be employed for treating paper, leather, resin-coated surfaces, etc. They also may be used in treating dyes prior to dyeing a fabric material or they may be employed to finish dyed fabrics. Because of the reactive nature of these polymeric and copolymeric compositions they also have application in anchoring fireproofing and rainproofing agents on fabric and other materials. In a similar manner, they may be employed for the purpose of anchoring dyes in fabrics.

In coating compositions the isocyanate polymerization products of this invention may be used directly to secure cured films, the water vapor present in the air ordinarily being sufficient to accelerate insolubilization and crosslinking. Alternatively, insolubilization and crosslinking can be achieved through the introduction of unsaturated components into the polymeric or copolymeric isocyanate. Unsaturation in the polymeric or copolymeric isocyanate is secured by reacting the polymer or copolymer with unsaturated compounds possessing appropriate functional groups, e. g., amino, hydroxy, carboxy, etc. Illustrative examples of compounds that thus may be reacted with the polymeric or copolymeric isocyanate to introduce unsaturation therein are acrylic acid, methacrylic acid, sorbic acid, undec- ylenic acid, linoleic acid, eleostearic acid, allyl alcohol, methallyl alcohol, undecenyl alcohol, methylol acrylamide, vinyl phenol, allyl amine, amino styrenes, methyl amino styrenes, etc.

The hardenable or potentially hardenable polymers and copolymers of our invention may be used alone or with fillers, dyes, pigments, opacifiers, etc., in a wide variety of casting, molding and laminating applications, as impregnants and surface-coating materials and for numerous other purposes. Thus they may be employed, for instance, in protectively coating surfaces of metal, wood, synthetic resins, etc., or as a finish coating over painted surfaces.

These new polymers and copolymers may be modified by the addition of other reactive or non-reactive materials, or they themselves may be used as modifiers of other substances which are rective or non-reactive with the copolymer. Illustrative examples of materials with which the reactive copolymers of this invention may be combined are compounds or substances containing one or more —OH groups, for instance: glycol, diethylene glycol, glycerine and other polyhydric alcohols; fatty oils of the kind examplified by castor oil; diglycerides; alkyl resins containing —OH groups, including polymerizable unsaturated alkyl resins containing —OH groups; urea-formaldehyde reaction products, e. g., mono- and dimenthylol ureas and their partial condensation products; melamine-formaldehyde reaction products, e. g., di-, tri-, tetra-, penta- and hexa- methylol melamines and their partial condensation products; acetylene urea; phenol-formaldehyde reaction products, e. g., saligenin and the more highly condensed phenol alcohols; polyvinyl phenols, sugars and starches; polyvinyl alcohol and partially esterfied and etherified polyvinyl alcohols; polyallyl and polymethallyl alcohols and partially esterfied and etherfied polyallyl and polymethallyl alcohols; cellulose and cellulose derivatives containing free hydroxyl groups, e. g., partially esterified cellulose, partially etherified cellulose, etc.; partially or wholly methylolated acrylamides; water-soluble natural gums, e. g., agar agar, tragacanth, pectin, etc.; silicols and their partial condensation products; e. g., mono-, di- and trimethyl silicols and mixtures thereof, mono-, di- and triphenyl silicols and mixtures thereof, mixtures of any or all of the aforementioned methyl and phenyl silicols, partial condensation products of the aforementioned silicols and mixtures thereof; and acids, including, for example cyanuric acid and derivatives thereof containing a hydrogen atom which is reactive with an isocyanate grouping.

Our new polymers and copolymers also may be combined with nitrogen-containing materials, e. g., ethylene imine, polyethylene imines, ethylene diamine, diethylene triamine and other polyethylene amines, polymethylene diamines, alkanolamines (e. g., mono-, di- and triethanol-amines, etc.), gelatin, chitin, monoamino and polyamino compounds such, for instance, as wool, silk zein, casein, regenerated fibers from soyabean, casein, keratin, collagen, etc., to yield new and useful materials or articles of manufacture.

From the foregoing it will be seen that our polymers and copolymers may be converted into useful derivatives by bringing them into reactive relationship with a compound containing a hydrogen atom which is reactive with the isocyanate grouping that is present in the polymer or copolymer. Among such reactive compounds are, as has been mentioned hereinbefore, those which contain an —OH group, for instance, compounds represented by the general formula ROH where R represents hydrogen or an alkyl radical, e. g., methyl, ethyl, propyl, butyl, isobutyl, etc.

Valuable polymers and copolymers also may be prepared by reacting a vinyl amino aromatic hydrocarbon, e. g., a vinylphenylamine, with phosgene to form a carbamyl chloride thereof, for instance a vinylphenylcarbamyl chloride such, for example, as one represented by the formula XVII 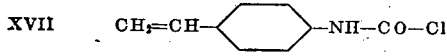

This chloride then is polymerized alone or with a monomeric material which is copolymerizable therewith, e. g., styrene, ethyl acrylate or other monomer or monomers such as mentioned hereinbefore with particular reference to the copolymerization of isocyanates of the kind embraced by Formula I. In cases where the vinylarylcarbamyl chloride is sufficiently water-insoluble, the chloride may be emulsion-polymerized alone or with another monomer or monomers copolymerizable therewith, using a suitable cationic emulsifying agent. The resulting polymer or copolymer is then heated to split off HCl and to convert the carbamyl chloride groupings in the polymer or copolymer to isocyanate groups. Alternatively, the polymeric and copolymeric isocyanates of our invention may be heated with, for example, concentrated hydrochloric or hydrobromic acid to yield the corresponding halide of the hydrolyzed or partially hydrolyzed polymer or copolymer. Or, our polymers and copolymers may be refluxed with a solution of hydrogen chloride in ethyl or other alcohol to provide an alcoholysis product (partially or substantially completely alcoholyzed product) of the polymer or copolymer. If desired, such hydrolysis or alcoholysis reactions may be effected in the absence of a catalyst.

The polymers and copolymers of this invention are especially valuable for use in the preparation of laminated and molded articles. Thus, they may be employed in treating sheet materials, e. g., paper, fabric materials of cotton, linen, asbestos, etc., which, with or without subsequent treatment with other resinous materials, e. g., melamine-aldehyde resins, urea-aldehyde resins, alkyd resins, etc., are thereafter dried, superimposed and laminated under heat and pressure to yield laminated articles wherein the polymer or copolymer has become an integral part of the sheet material. They also may be used advantageously in binding together wood flour, alpha-cellulose and other finely divided fillers to form molded articles of manufacture. In the case of those fillers that contain a hydrogen atom or atoms reactive with the isocyanate grouping, the polymerization product reacts therewith to yield a product in which the polymer or copolymer is chemically bound therein. Finely divided fillers also may be pretreated with these new polymerization products prior to incorporation in conventional molding compositions, e. g., phenol-formaldehyde, urea-formaldehyde, melamine-formaldehyde, etc., molding compositions. Or, the filler combined with phenol-formaldehyde, urea-formaldehyde or other synthetic resin may be treated with these new polymers or copolymers during the preparation of the molding composition.

The process of treating textile, more particularly organic textile, hydrogen-donor materials with reactive polymerization products of this invention and the products of such treatment are claimed in our copending application Serial No. 741,957, filed concurrently herewith.

We claim:

1. Chemical compounds represented by the general formula $CH_2=CH-Ar-N=C=O$ where Ar represents a divalent aromatic hydrocarbon radical, the vinyl and isocyanate groupings being each directly attached to the aromatic nucleus of the said divalent radical.

2. Chemical compounds as in claim 1 wherein Ar represents a lower alkyl-substituted phenylene radical.

3. Chemical compounds represented by the general formula

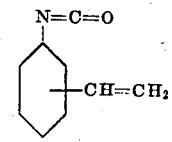

4. Chemical compounds represented by the general formula

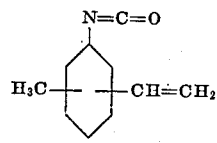

5. A mixture of m-vinylphenylisocyanate and p-vinylphenylisocyanate.

6. 2-methyl-5-vinylphenylisocyanate.

7. A composition comprising a product of polymerization of a polymerizable mass, said mass including a compound represented by the general formula $CH_2=CH-Ar-N=C=O$ where Ar represents a divalent aromatic hydrocarbon radical, the vinyl and isocyanate groupings being each directly attached to the aromatic nucleus of the said divalent radical.

8. A substance comprising the product of reaction of (1) a product of polymerization of a polymerizable mass, said mass including a compound represented by the general formula $$CH_2=CH-Ar-N=C=O$$

where Ar represents a divalent aromatic hydrocarbon radical, the vinyl and isocyanate groupings being each directly attached to the aromatic nucleus of the said divalent radical, and (2) a compound containing a hydrogen atom which is reactive with the isocyanate grouping present in the polymerization product of (1).

9. A polymerizable composition comprising (1) an isocyanate represented by the general formula $CH_2=CH-Ar-N=C=O$ where Ar represents a lower alkyl-substituted phenylene radical, the vinyl and isocyanate groupings being each directly attached to the benzene nucleus of the said phenylene radical, and (2) a different organic compound which is copolymerizable with the isocyanate of (1), which contains a $CH_2=C<$ grouping and which is free from a hydrogen atom reactive with the isocyanate grouping.

10. A product comprising the polymerized composition of claim 9.

11. A copolymer which is the product of polymerization of a mixture containing (1) an isocyanate represented by the general formula

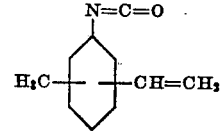

and (2) an acrylic compound containing a single $CH_2=C<$ grouping and which is free from a hydrogen atom reactive with the isocyanate grouping, said ingredients of (1) and (2) being copolymerizable.

12. A polymerizable composition comprising (1) a vinylphenylisocyanate and (2) a different organic compound which is copolymerizable with the isocyanate of (1), which contains a $CH_2=C<$ grouping and which is free from a hydrogen atom reactive with the isocyanate grouping.

13. A copolymer of copolymerizable ingredients comprising (1) m-vinylphenylisocyanate and (2) p-vinylphenylisocyanate.

14. A composition comprising the product of polymerization of a polymerizable mass, said mass including (1) a mixture of m-vinylphenylisocyanate and p-vinylphenylisocyanate and (2) an acrylic compound containing a single $CH_2=C<$ grouping and which is free from a hydrogen atom reactive with the isocyanate grouping, said ingredients of (1) and (2) being copolymerizable.

15. A composition comprising the product of polymerization of a polymerizable mass, said mass including (1) a mixture of m-vinylphenylisocyanate and p-vinylphenylisocyanate and (2) a monovinyl aromatic compound which is different from the isocyanates of (1), is copolymerizable therewith, and is free from a hydrogen atom reactive with the isocyanate grouping.

16. A copolymer which is the product of polymerization of a mixture containing (1) an isocyanate represented by the general formula

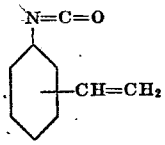

and (2) an acrylic ester containing a single $CH_2=C<$ grouping and which is free from a hydrogen atom reactive with the isocyanate grouping, said ingredients of (1) and (2) being copolymerizable.

17. A copolymer which is soluble in inert organic liquids, said copolymer being a product of polymerization of a mixture containing (1) ethyl acrylate and (2) an isocyanate represented by the general formula

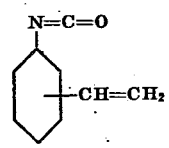

the proportions of the said ingredients of (1) and (2) in the said mixture being such that the said copolymer has an average of at least two isocyanate groupings per molecule.

18. A copolymer which is soluble in inert organic liquids, said copolymer being a product of polymerization of a mixture containing (1) styrene and (2) an isocyanate represented by the general formula

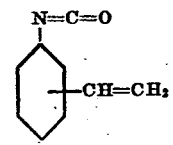

the proportions of the said ingredients of (1) and (2) in the said mixture being such that the said copolymer has an average of at least two isocyanate groupings per molecule.

19. A toluene-soluble copolymer of, by weight, from about 3 to about 50 per cent of ethyl acrylate and from about 97 to 50 per cent of a mixture of m-vinylphenylisocyanate and p-vinylphenylisocyanate.

20. A toluene-soluble copolymer of, by weight, from about 3 to about 50 per cent of styrene and from about 97 to about 50 per cent of a mixture of m-vinylphenylisocyanate and p-vinylphenylisocyanate.

21. The method of preparing a chemical compound represented by the general formula $CH_2=CH-Ar-N=C=O$ where Ar represents a divalent aromatic hydrocarbon radical and in which the vinyl and isocyanate groupings are each directly attached to the aromatic nucleus of the said divalent radical, said method comprising effecting reaction between phosgene and a compound represented by the general formula $CH_2=CH-Ar-NH_2$ where Ar has the meaning above given and in which the vinyl and amino groupings are each directly attached to the aromatic nucleus of the divalent aromatic hydrocarbon radical represented by Ar in the said formula, said reaction being effected while the said reactants are in contact with each other in a liquid medium in which they are inert and at a temperature ranging from $-10°$ C. up to the reflux temperature of the reaction mass, and isolating a compound represented by the first formula above-mentioned from the resulting reaction mass.

22. The method of preparing a new synthetic composition which comprises polymerizing under anhydrous conditions a polymerizable mass including a compound represented by the general formula $CH_2=CH-Ar-N=C=O$ where Ar represents a divalent aromatic hydrocarbon radical, the vinyl and isocyanate groupings being each directly attached to the aromatic nucleus of the said divalent radical.

23. The method which comprises polymerizing under anhydrous conditions a polymerizable mass including a compound represented by the general formula $CH_2=CH-Ar-N=C=O$ where Ar represents a divalent aromatic hydrocarbon radical and in which the vinyl and isocyanate groupings are each directly attached to the aromatic nucleus of the said divalent radical thereby to obtain a polymeric product containing a reactive isocyanate grouping, and bringing the said product into reactive relationship with a compound containing a hydrogen atom which is reactive with the isocyanate grouping present in the said product.

EDWARD L. KROPA.
ARTHUR S. NYQUIST.

REFERENCES CITED

The following references are of record in the file of this patent:

UNITED STATES PATENTS

| Number | Name | Date |
| --- | --- | --- |
| 2,326,287 | Coffman | Aug. 10, 1943 |

Certificate of Correction

Patent No. 2,468,713.

April 26, 1949.

EDWARD L. KROPA ET AL.

It is hereby certified that errors appear in the printed specification of the above numbered patent requiring correction as follows:

Column 6, lines 29 and 37, after the word "vinyl" insert *amino*; line 73, after "reaction" strike out the comma and insert instead a semicolon; column 9, line 65, for "vinylidine" read *vinylidene*; column 11, line 14, for "copolymerizables" read *copolymerizable*; line 19, for "copolymerizable" read *copolymerizable*; line 52, for "limitatiton" read *limitation*; column 12, line 21, for "recipitate" read *precipitate*; column 14, line 4, after "of" and before "by" insert a comma; column 16, lines 64 and 65, for "biphenylisocyanate" read *biphenylylisocyanate*; column 17, line 51, before "vinylarylisocyanate" insert *a*; column 20, lines 26 and 28, for "alkyl" read *alkyd*; line 37, after "phenols" strike out the comma and insert instead a semicolon; line 65, after "silk" insert a comma;

and that the said Letters Patent should be read with these corrections therein that the same may conform to the record of the case in the Patent Office.

Signed and sealed this 27th day of September, A. D. 1949.

[SEAL]

THOMAS F. MURPHY,
*Assistant Commissioner of Patents.*